US011047949B2

(12) United States Patent
Beck et al.

(10) Patent No.: US 11,047,949 B2
(45) Date of Patent: Jun. 29, 2021

(54) INFRARED SENSOR ASSEMBLY AND POSITIONING SYSTEM

(71) Applicant: Awarri Limited, Bristol (GB)

(72) Inventors: Christopher James Beck, Bristol (GB); John Honniball, Bristol (GB)

(73) Assignee: Awarri Limited, Bristol (GB)

( * ) Notice: Subject to any disclaimer, the term of this patent is extended or adjusted under 35 U.S.C. 154(b) by 132 days.

(21) Appl. No.: 16/558,784

(22) Filed: Sep. 3, 2019

(65) Prior Publication Data

US 2020/0018819 A1 Jan. 16, 2020

Related U.S. Application Data

(63) Continuation of application No. PCT/EP2018/055215, filed on Mar. 2, 2018.

(30) Foreign Application Priority Data

Mar. 3, 2017 (GB) .................................... 1703474

(51) Int. Cl.
G01S 5/16 (2006.01)
G05D 1/02 (2020.01)
B62D 57/032 (2006.01)

(52) U.S. Cl.
CPC .............. G01S 5/16 (2013.01); G05D 1/0242 (2013.01); G05D 1/0287 (2013.01); B62D 57/032 (2013.01); G05D 2201/0214 (2013.01)

(58) Field of Classification Search
CPC ...... G01S 5/16; G05D 1/0242; G05D 1/0287; G05D 2201/0214; B62D 57/032

USPC ......................................................... 701/300
See application file for complete search history.

(56) References Cited

U.S. PATENT DOCUMENTS

| 5,398,008 A | 3/1995 | Nissler et al. |
| 5,819,008 A | 10/1998 | Asama et al. |
| 2004/0186623 A1* | 9/2004 | Dooley ................ G05D 1/0044 700/245 |
| 2004/0236470 A1 | 11/2004 | Dooley et al. |
| 2016/0223636 A1 | 8/2016 | Lohbihler |

FOREIGN PATENT DOCUMENTS

WO 2010085877 A1 8/2010

OTHER PUBLICATIONS

International Search Report and Written Opinion dated Jun. 26, 2018.

* cited by examiner

Primary Examiner — Gertrude Arthur Jeanglaude
(74) Attorney, Agent, or Firm — EIP US LLP

(57) ABSTRACT

Examples are provided of an entertainment robot featuring an infrared apparatus for use in determining a position of an object. In these examples, a power supply of a plurality of infrared transmitters is varied, wherein a control value used to set the power supply is transmitted by the plurality of infrared transmitters. The examples may be used in a first entertainment robot, for example, to determine a distance and orientation of another entertainment robot using received infrared signals. The entertainment robot may be controlled by a computing device such as a smartphone or tablet. The entertainment robot may comprise a gaming robot to be used in solo or group gaming activities.

20 Claims, 5 Drawing Sheets

INFRARED SENSOR ASSEMBLY AND POSITIONING SYSTEM

CROSS-REFERENCE TO RELATED APPLICATIONS

This application is a continuation of International Application No. PCT/EP2018/055215, filed Mar. 2, 2018, which claims priority to UK Application No. GB1703474.5, filed Mar. 3, 2017, under 35 U.S.C. § 119(a). Each of the above-referenced patent applications is incorporated by reference in its entirety.

BACKGROUND OF THE INVENTION

Field of the Invention

The present invention relates to an apparatus for use in determining a position of an object. In particular, but not exclusively, the present invention relates to an entertainment robot, such as a gaming robot. The entertainment robot comprises an infrared positioning system for determining a distance and orientation of another entertainment robot. The entertainment robot may be controlled by a computing device such as a smartphone or tablet. The entertainment robot may be used in solo or group gaming activities.

Description of the Related Technology

The consumer robotic market is expanding rapidly and a variety of robotic devices are now available to consumers. Consumer robotic devices, in particular legged robots (e.g. spider-like robots), however tend to fit within two distinct categories.

A first category of legged robot may be referred to as toy robots. Toy robots are typically available through mainstream retailers and are sold fully-assembled and ready to use. They have the appearance of a finished product and are aesthetically pleasing in the sense that the function of the robot has only a limited impact on the form of the robot. This is essentially because toy robots have only limited functionality with reduced motion to limit the purchase cost and as such tend to be limited in scope. Toy robots are also typically not designed to be serviceable by the user and are therefore considered disposable items.

A second category of legged robots may be referred to as hobbyist robots. Such robotic devices are usually only available through specialist retailers and tend to be more advanced than toy robots due to the fact that cost and complexity is less of an issue for the market these devices address. Hobbyist robots often come in the form of a kit of parts for self-assembly by the user. They have increased freedom of movements compared with toy robots for improved mobility and may be serviced by the user if required to extend the product life. However, such hobbyist robots do not have the finished appearance of toy robots and are instead somewhat industrial in appearance in the sense that the form of the robot is drastically influenced by its function.

Consumer robotic devices often need to locate themselves and other objects within their environment. To do this, robotic devices often incorporate one of two solutions. A first solution uses infrared or ultrasonic range sensors to determine a distance of a hard surface in front of the device. This solution operates based on reflected signals. A second solution uses a digital camera and advanced image processing techniques to build a model of the surrounding space. The first solution is typically low cost and low power and so is suitable for toy robots with limited capacities. However, only limited positioning information is available. The second solution comes at a high component cost, and requires substantial processing capabilities, such as a high-powered laptop computer.

There is thus a desire for more advanced positioning information in low cost and low power robotic devices. Likewise, there is a desire for component subsystems that enable provision of this information.

US 2004/0236470 A1 discloses a system for providing communication of position information between moving bodies navigating in proximity of each other. Messages can be communicated via the same system. Orientation information is provided by transmitting infrared digital signals that are specific to individual zones around the moving body. By knowledge of the relation between the position of the zones and the specific signals an orientation can be deduced by a receiving body. Distance information is provided by transmitting infrared digital signals from a transmitter at respective power levels, at which power levels the signals comprise information for identifying the specific power level. By knowledge of the relation between the range of the zones and the specific signals a distance from a receiving body to the transmitter can be deduced. Direction information is provided by knowledge of the position of reception zones and signals received.

The system of 2004/0236470 A1 uses multiple power levels to transmit infrared digital signals. Time-multiplexing is used wherein a low/medium ping-signal from an emitter comprises three bytes transmitted in a first timeslot at a medium power level and one byte transmitted in a second timeslot at a low power level. The last of the three bytes in the first timeslot and the byte of the second timeslot comprise a cyclic redundancy check (CRC) byte. This common CRC byte is transmitted at the two different power levels. For three power levels, a further set of high power ping-signals may be transmitted. A state machine is used to iterate through a series of emitters and construct the four-byte sequence for each emitter. A separate state machine is used for the high-power ping-signals.

WO 2010/085877 A1 discloses a method and apparatus for ranging finding of signal transmitting devices is provided. It may be applied to an industrial robot, e.g. on an assembly line. In this case, transmitting devices may be located on moveable points of the industrial robot. An array of receiver units that are proximal to the robot may be used to determine where the industrial robot is located in absolute terms.

SUMMARY

Aspects of the present invention are set out in the appended independent claims. An entertainment robot is disclosed, the entertainment robot can comprise: a plurality of transmission circuits, each transmission circuit comprising an infrared transmitter controlled by a respective data line; a plurality of infrared receivers; at least one processor to generate respective data signals for supply on each of the data lines of the infrared transmitters, each of the generated data signals for the infrared transmitters comprising a bit pattern identifying a respective one of the infrared transmitters and a bit pattern indicating a signal strength, wherein the at least one processor is programmed to: receive data signals from another entertainment robot via one or more of the plurality of infrared receivers, decode the received data signals to determine bit patterns indicating a set of signal strengths at which the received data signals were transmitted, decode the received data signals to determine bit patterns indicating a set of infrared transmitters of the other entertainment robot from which the received data signals were transmitted, and determine a distance and orientation of the other entertainment robot based on the determined bit patterns and the one or more of the plurality of infrared receivers, wherein each transmission circuit further comprises: a voltage-controlled current source to vary a current supplied to each infrared transmitter based on a voltage set on a power level signal line; and wherein the entertainment robot further comprises: a controlled voltage source to set the voltage of the power level signal lines as one of a range of analog output voltages based on a digital control signal, wherein a value of the digital control signal is used to set the bit pattern indicating the signal strength in the generated data signals.

In another aspect, a method of determining a position of a first entertainment robot with respect to a second entertainment robot is disclosed. The method can comprise: at the second entertainment robot: determining a set of digital control signal values for a controlled voltage source; generating a set of data signals for each of a plurality of infrared transmitters, each of the set of data signals comprising: a bit pattern identifying an infrared transmitter from the set of infrared transmitters that is to transmit the data signal, and a bit pattern indicating a transmission strength for the data signal, the bit pattern being generated based on one of the set of digital control signal values, wherein the set of data signals comprise bit patterns for each infrared transmitter and each of the set of digital control signal values; and applying the set of digital control signal values to control a voltage output by the controlled voltage source, the voltage being used to vary a current of a voltage-controlled current source provided for each infrared transmitter; and sending the data signals to the plurality of infrared transmitters such that the bit patterns indicating a transmission strength are synchronised with the applied set of digital control signal values; at the first entertainment robot: receiving, via a plurality of infrared receivers of the first entertainment robot, one or more of the set of infrared data signals transmitted by the second entertainment robot, decoding the received data signals to determine the bit patterns indicating a set of signal strengths at which the received data signals were transmitted, decode the received data signals to determine the bit patterns indicating a set of infrared transmitters of the second entertainment robot from which the received data signals were transmitted, and determine a distance and orientation of the second entertainment robot based on the determined bit patterns and the one or more of the plurality of infrared receivers.

Certain variations of these aspects are set out in the appended dependent claims.

Further features and advantages of the invention will become apparent from the following description of certain examples, which is made with reference to the accompanying drawings.

DETAILED DESCRIPTION OF CERTAIN INVENTIVE EMBODIMENTS

Figure 1:
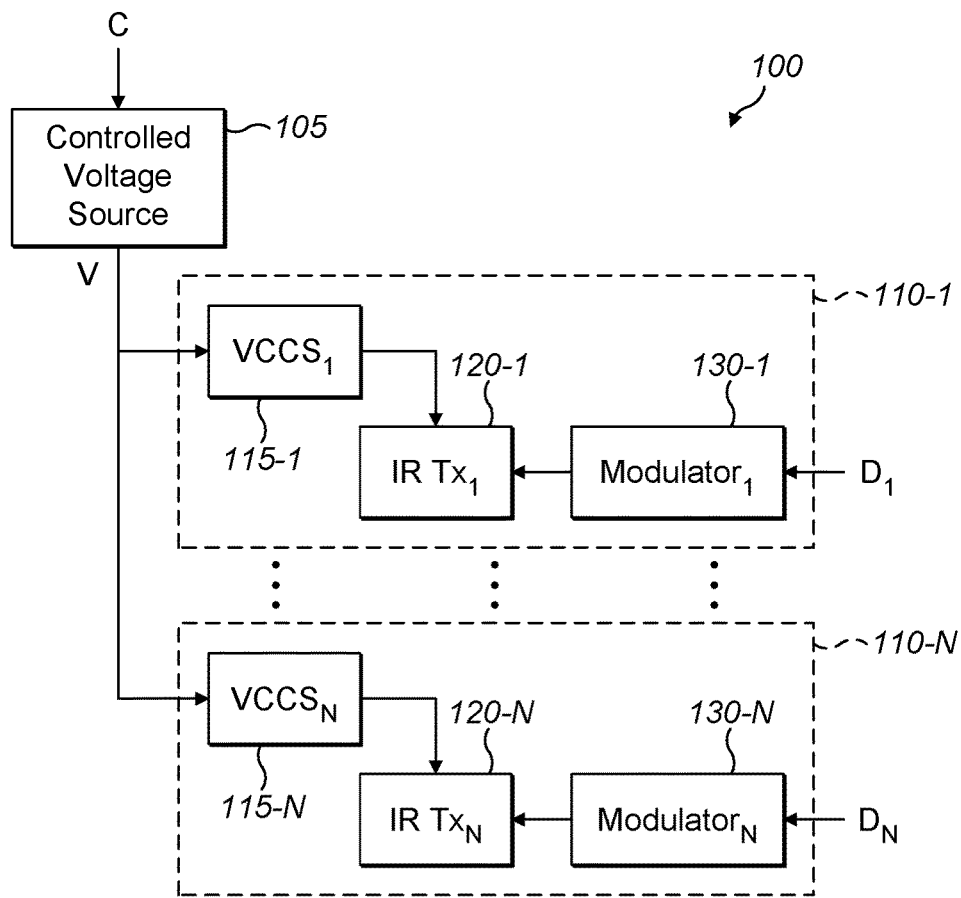
FIG. 1 is a schematic diagram of an example infrared sensor assembly.

Examples are provided of a robotic device, and in particular, an infrared apparatus for use in an entertainment robot, such as a gaming robot, to determine a position of an object such as another robot. Examples may be provided in the form of an infrared sensor assembly, a positioning system, an embedded controller and a method of determining a position of an object. In these examples, a power supply of a plurality of infrared transmitters is varied, wherein a control value used to set the power supply is transmitted by the plurality of infrared transmitters. The examples may be used in an entertainment robot with controllable locomotion in three-dimensions, for example to determine a distance and orientation of another entertainment robot using received infrared signals. The robotic device may comprise a gaming robot that is controlled by a computing device such as a smartphone or tablet. The gaming robot may be used in solo or group gaming activities.

As set out above, certain examples described herein provide an infrared positioning system for an entertainment robot. The positioning system is configured to determine a distance and orientation of another entertainment robot, such as another entertainment robot having the positioning system. The positioning system is low power and low cost, and so may be implemented within consumer robotic devices that operate on battery power.

Certain examples described herein also provide an infrared sensor assembly and embedded controller that may be used, together or independently, to implement certain subsystems of the aforementioned positioning system. The infrared sensor assembly provides an independent current source for each infrared transmitter than may be commonly controlled. This independent current source provides a configuration that reduces a risk of damaging infrared transmitters. A method of determining a position of a first entertainment robot with respect to a second entertainment robot is also described.

The examples described herein may be used to provide distance and/or orientation information to one or more embedded processors of an entertainment robot. This information may be used by the entertainment robot to navigate its environment and/or interact with other entertainment robots. This information may be provided without the need for specialised chipsets, which may be of prohibitive cost or size.

In certain examples, the distance and/or orientation information may be used by a gaming robot to determine a position of another gaming robot in a "battle" game. The other gaming robot may be a competing device or an ally. The distance and/or orientation information may be used in battle computations and/or to render an augmented reality on a display of an associated computing device such as a smartphone. In certain examples, distance and/or orientation information of robotic devices may be shared between devices, such as over peer-to-peer networks set up between the devices and/or via a server device communicatively coupled to the devices.

FIG. 1 is a schematic diagram that shows an infrared sensor assembly 100 according to an example.

The infrared sensor assembly 100 comprises a controlled voltage source 105 and a plurality of transmission circuits 110. In FIG. 1, N transmission circuits are shown. The controlled voltage source 105 is configured to receive a digital control signal, C, and to output an analog voltage, V. The digital control signal C sets a power level for the set of transmission circuits 110, wherein the power level is controlled by the analog voltage, V.

As shown in FIG. 1, each transmission circuit comprises a voltage-controlled current source (VCCS) 115, an infrared transmitter 120 and a modulator 130. Each infrared transmitter 120 in a transmission circuit 110 is electrically coupled to a corresponding voltage-controlled current source 115, wherein the latter varies a current supplied to the infrared transmitter 120 based on the output, V, of the controlled voltage source 105. As such, the digital control signal C sets the signal strength of the plurality of infrared transmitters 120, wherein all transmitters, for a given digital control signal C have a common signal strength.

Each infrared transmitter 120 in a transmission circuit 110 is also electrically coupled to a corresponding modulator 130. Each modulator 130 is configured to receive a data signal, $D_n$, and to control the transmission of a coupled infrared transmitter 120 according to the data signal. Each modulator 130 receives a data signal that is specifically generated for the coupled infrared transmitter 120, such that two modulators 120-1 and 120-2 will receive different data signals. In certain cases, each modulator may comprise switching circuitry to rapidly switch the infrared transmitter on and off according to a modulated data signal.

Each of the data signals, $D_n$, comprises data identifying a respective one of the plurality of infrared transmitters and data indicating a signal strength that is dependent on a value of the digital control signal. For example, a data signal, $D_1$, for modulator 130-1 to be transmitted by infrared transmitter 120-1 may comprise a bit pattern identifying infrared port "1" as the transmitting port (e.g. '00' or '01' in bits depending if the port numbering started at 0 or 1). Similarly, a data signal, $D_2$, for modulator 130-2 to be transmitted by infrared transmitter 120-2 may comprise a bit pattern identifying infrared port "2" as the transmitting port (e.g. '01' or '10' in bits depending if the port numbering started at 0 or 1). Similarly, each of the data signals, $D_n$, may comprise a bit pattern indicating the signal strength at which the data signal is to be transmitted. This bit pattern may be derived from, and/or consist of, the value of the digital control signal that is to be applied during transmission. For example, if the digital control signal, C, is quantised and has a range of possible values, e.g. is a 7 or 8 bit signal having 128 or 256 possible values, then the data indicating the signal strength may comprise a value of this bit signal. The number of bits that make up this bit pattern may depend on the number of different signal strength levels. In certain cases, the digital control signal may be restricted to a subset of values, e.g. even if the controlled voltage source 105 is controlled using a 7 or 8 bit signal, only a 2 to 4-bit signal strength value may be used, indicating a subset of 4 to 16 different signal strength levels to be used (e.g. '01' may indicate a signal level of 2 or '0110' may indicate a signal level of 6, wherein the same bit pattern is used to control the controlled voltage source 105). The number of signal strength values that are used may depend be configurable and may vary for each implementation.

Each infrared transmitter 120 may comprise an infrared light emitting diode (LED). In one implementation, each LED may comprise a VSLY3850 or the like from Vishay Intertechnology, Inc.

In each transmission circuit 110, an infrared transmitter 120 may be electrically coupled in series with an associated modulator 130. In one case, the associated modulator 130 may be electrically coupled between the infrared transmitter 120 and ground. "Electrically coupled" as used herein includes both direct and indirect electrical connections. Each transmission circuit 110 may have a common arrangement of components yet a separate electrical coupling to a specific data signal.

The controlled voltage source 105 controls the power supplied to the infrared transmitters 120 based on the digital control signal, C. In each transmission circuit 110, the voltage-controlled current source 115 has an analog voltage, V, set by the output of the controlled voltage source 105. Each voltage-controlled current source 115 in turn controls a current supplied to a corresponding infrared transmitter 120 based on this analog voltage. In one example, the controlled voltage source comprises a digital voltage controller. The digital voltage controller may comprise an integrated circuit. In one case, the digital voltage controller comprises a digital potentiometer or digital-to-analog converter. The digital control signal may comprise an I²C serial protocol signal. The digital control signal may comprise serial data indicating a signal strength and a serial clock signal. The digital control signal may indicate that a value is to be set at a given data address. The digital potentiometer may comprise a MCP455x or the like from Microchip Technology Inc. In certain examples, the controlled voltage source may be implemented using a digital-to-analog port on a processor such as a microcontroller, where an analog signal to control each independent current source for the infrared transmitters is output by the processor port based on a digital control signal set within the processor.

In one example, the controlled voltage source 105 may comprise a voltage buffer. Each voltage-controlled current source 115 may comprise a transistor electrically coupled in series between an infrared transmitter 120 and a modulator 130, wherein the transistor is controlled by an output of the voltage buffer, and wherein the output of the voltage buffer controls each transistor in the plurality of transmission circuits. Each transistor implementing a corresponding voltage-controlled current source 115 may comprise an NPN bipolar junction transistor. The voltage-controlled current source 115 may also comprise a resistor that is electrically coupled in series between the transistor and the modulator 130. This resistor may comprise a negative feedback resistor that enables each infrared transmitter 120 to be independently modulated and to have independent power regulation for a given signal strength. The resistor may draw a current from a voltage source electrically coupled to the infrared transmitter.

In the above example, the voltage buffer may comprise an emitter-follower that provides enough current to drive the transistor electrically coupled in series between each infrared transmitter 120 and modulator 130. The voltage buffer may comprise an NPN bipolar junction transistor, wherein a voltage at the base of the voltage buffer is set by the output of the controlled voltage source 105. The voltage buffer may be coupled to an electrical load, such as one or more resistors, such that the current at the base of the voltage buffer is proportional to the analog voltage output by the controlled voltage source 105. In these cases, varying the voltage at the base of the voltage buffer varies an input to the voltage-controlled current source 115 for each transmission circuit 110, and in turn varies the current that flows through the infrared transmitter 120, which controls the strength of emitted infrared light. The voltage supply for each transmission circuit may be greater than the voltage supply for the voltage buffer, for example the former may be 6 Volts and the latter 3.3 Volts. Each transmission circuit may also comprise a bulk capacitor connected between a voltage supply and ground to regulate the power supplied, e.g. to accommodate fast switching in current requirements as the infrared transmitters are controlled by the modulators.

Each modulator 130 may comprise a switch such as an N-channel metal-oxide-semiconductor field-effect transistor (MOSFET) to control when a coupled infrared transmitter transmits light. The gate of such an N-channel MOSFET may be electrically coupled to a data line for a given infrared transmitter. The data line may provide a data signal to modulate light transmitted from the infrared transmitter. The data signal may comprise a modulated signal that is applied to the gate of the MOSFET to modulate transmitted light. The data signal may comprise a binary bit stream that is applied to an underlying carrier signal. A number of carrier frequencies may be used. The carrier frequency may be configurable, e.g. by a supplying microcontroller. In one implementation, a carrier frequency of 38 kHz may be used.

The infrared sensor assembly 100 of FIG. 1 enables each infrared transmitter 120 in the plurality of infrared transmitters to transmit at the same signal strength for a given message while enabling the data of each message to correspondingly vary with each transmitter. The infrared sensor assembly 100 of FIG. 1 provides a low cost and low power infrared transmission system that may be used to transmit signals that may be decoded by a receiver to determine a distance and orientation of the transmission system. Although the examples set out below describe an implementation within a robotic device, other implementations are also possible. For example, static beacons may comprise the infrared sensor assembly 100 and moveable devices may receive infrared signals from said beacons to determine their location and orientation. In certain cases, the modulators may form part of a single infrared transmission sensor together with a transmitting LED, where the transmission sensor is configured to receive a data signal on a predetermined carrier wave.

Figure 2:
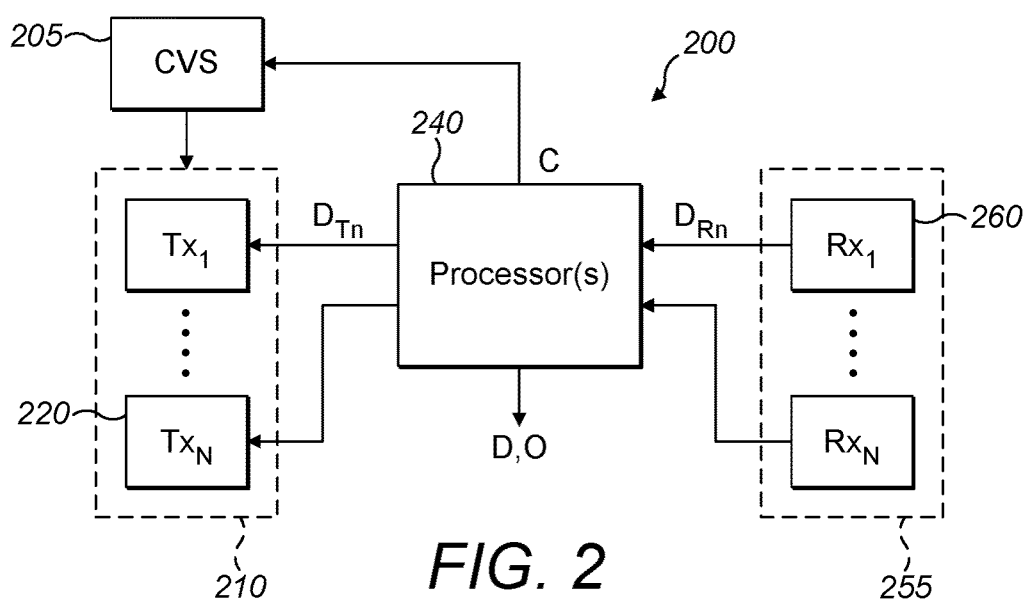
FIG. 2 is a schematic diagram of a positioning system for a robotic device according to an example.

FIG. 2 is a schematic diagram of a positioning system 200 for a robotic device. The positioning system 200 comprises a controlled voltage source (CVS) 205 and transmission circuitry 210. The transmission circuitry 210 comprises a plurality of infrared transmitters—$Tx_n$—220. Each infrared transmitter 220 is electrically coupled to an independent voltage-controlled current source. The transmission circuitry 210 may comprise a plurality of transmission circuits, such as circuits 110 in FIG. 1. In certain cases, the controlled voltage source 205 and transmission circuitry 210 may comprise the infrared sensor assembly 100 of FIG. 1. The controlled voltage source 205 is electrically coupled to the infrared transmitters 220 and varies the power supplied to the infrared transmitters 220 based on a digital control signal, C. In certain cases, the plurality of infrared transmitters 220 are respectively coupled to a plurality of respective modulators as described with reference to FIG. 1. In other cases, each infrared receiver is arranged to transmit infrared radiation based on a modulated data signal.

FIG. 2 also shows at least one processor 240 that is configured to provide the digital control signal, C, for the controlled voltage source 205 and transmission data signals, $D_{Tn}$, for each of the N infrared transmitters 220. Each of the data signals, $D_{Tn}$, comprises data identifying a respective one of the infrared transmitters 220 and data indicating a signal strength that is dependent on a value of the digital control signal, C. The data signals, $D_{Tn}$, may comprise a modulated signal. The data signals, $D_{Tn}$, may also comprise data identifying the robotic device comprising the processing system 200, such as an identifying integer (e.g. 8 or 16-bit) or other identifying string. The data identifying the robotic device may comprise a globally unique identifier for the robotic device that is stored in a memory of the robotic device and is accessible, or communicated, to the at least one processor 240. As described previously, the data signals, $D_{Tn}$, may comprise a stream of individual bits carried upon a 38 kHz carrier wave. The carrier wave may be a square wave.

The at least one processor 240 may comprise one or more integrated circuits, system-on-chips, application specific integrated circuits (ASICs), field-programmable gate arrays (FPGAs) or embedded central processing units. The at least one processor 240 may comprise an m-bit microcontroller, where m is, amongst other values, 8, 16, 32 or 64 bits. In one example implementation, the at least one processor 240 comprises a Peripheral Interface Controller (PIC) microcontroller or the like, e.g. as supplied by Microchip Technology Inc. In certain implementations, the at least one processor 240 may comprise multiple interconnected processors, e.g. one or more microcontrollers electrically coupled to a central controlling microcontroller. Although FIG. 2 shows both the digital control signal, C, and the data signals, $D_{Tn}$, originating from a single processor, in certain embodiments the digital control signal, C, may be generated by a first microcontroller and communicated to a plurality of second microcontrollers, each of the plurality of second microcontrollers being arranged to generate a data signal for a respective infrared transmitter 220. In certain implementations, the controlled voltage source 205 may form part of the at least one processor 240, e.g. in the form of a digital-to-analog output as described above.

The processing system 200 of FIG. 2 also shows infrared receiver circuitry 255, which comprise a plurality of infrared receivers 260. In FIG. 2, the number of infrared transmitters (N) is equal to the number of infrared receivers (N); however, the ratio of transmitters to receivers may differ in different implementations. In a simple case, location and orientation may be determined based on transmissions from a single infrared transmitter that are received by one of two infrared receivers. Each of the plurality of infrared receivers 260 is configured to receive a transmitted infrared signal, $D_{Rn}$, and communicate this signal to the at least one processor 240. In one case, the plurality of infrared receivers 260 receive infrared signals transmitted by another processing system of another robotic device.

The at least one processor 240 of FIG. 2 is configured to receive data signals from the plurality of infrared receivers 260. In one implementation, each of the plurality of infrared receivers 260 comprises integrated circuitry to receive and demodulate an infrared signal. For example, each infrared receiver 260 may comprise a TSOP382 or the like as supplied by Vishay Intertechnology, Inc. that is configured to demodulate data signals, such as those at 38 kHz. In this case, an output from each infrared receiver 260 may be coupled to an interface such as an interrupt pin of the at least one processor 240. Each infrared receiver may be electrically coupled to a different interrupt pin of the at least one processor 240 or multiplexed onto a common interrupt pin. In other implementations, demodulation may be performed by the at least one processor 240 or associated intermediate circuitry.

The at least one processor 240 is programmed to determine a distance and orientation of another robotic device based on demodulated data signals from the plurality of infrared receivers 260. For example, the at least one processor 240 may retrieve computer program code from an associated memory and execute this code. In other cases, the at least one processor 240 may be specifically structured to provide the programmed functionality, e.g. in the form of an ASIC or FPGA. The other robotic device may comprise a processing system such as that shown in FIG. 2.

The at least one processor 240 is first programmed to determine the infrared receiver that received the data signal. If the at least one processor 240 comprises an interface for each of the plurality of infrared receivers 260, such as an interrupt pin, the infrared receiver may be determined by determining the interrupt pin the data signal is received on. In the at least one processor 240 comprises a single interface that receives a multiplexed signal then the infrared receiver may be determined based on timing and/or frequency information associated with the received data signal.

Once the infrared receiver is determined, the at least one processor 240 is programmed to decode message data from the received data signal to determine: data identifying one of a plurality of infrared transmitters that transmitted the data signal, and data indicating a transmission strength for the data signal. This may comprise decoding a bit stream where the data identifying one of a plurality of infrared transmitters is set as a first bit pattern and the data indicating the transmission strength for the data signal is set as a second bit pattern (e.g. 110100 may indicate an infrared transmission port "3"—from 11—and a transmitted signal strength of "4" out of 16 levels—from 0100).

The at least one processor 240 is then programmed to determine an orientation of the robotic device in relation to the other robotic device using the determined infrared receiver, the data indicating the transmission strength for the data signal and the data identifying the infrared transmitter that transmitted the data signal. If the processing system 200 and the processing system of the transmitting robotic device have a common or agreed-upon transmitter and receiver configuration, then the determined infrared receiver and the data identifying the infrared transmitter that transmitted the data signal enable the at least one processor 240 to compute which transmitting ports a given receiving port can "see" (i.e. can receive a signal from). From this information, an orientation may be determined. The angular resolution of the orientation depends on the number of infrared transmitters and/or the number of infrared receivers. For example, a positioning system 200 with four equidistantly spaced infrared transmitters and receivers around a body of the associated robotic device, may have an orientation fidelity of 45 degrees. Further details of an example orientation determination process are provided later below.

The at least one processor 240 is also programmed to use the data indicating the transmission strength for the data signal to determine a distance of the robotic device from the other robotic device. In certain examples, a set of signal strengths may be applied to a transmitted signal. In this case, a subset of received signals may be determined by the at least one processor 240. The subset of received signals may then indicate a distance, e.g. based on a lowest signal strength that is successfully received in a set of received signals. This may assume an average attenuation with distance. In these examples, the signal strength of a received data signal need not be measured directly; rather, a signal with data indicating a signal strength is either received correctly or is not received. This can avoid the need for analog receiver components to measure signal strength, reducing cost and complexity.

In one case, the at least one processor 240 is coupled to a memory comprising a list of possible bit patterns. If a received data signal matches one of the list, it is deemed to be received as the matching bit pattern. If a received data signal does not match one of the list, it is deemed not to be a valid bit pattern and is discarded. In this case, signals that are too weak to be received properly, are discarded as they contain corrupted bits. In other case, an error control scheme may be used to determine if one or more errors have been introduced into the bit stream. If one or more errors are detected, then a received data signal may be discarded as being invalid. In cases where the infrared receiver comprises an integrated demodulator, this demodulator may filter infrared signals that are received below a preset or configurable power level. In these cases, weak data signals that are received may not be passed to the at least one processor 240.

In the cases described above, the at least one processor 240 determines a set of successfully received data signals. This set may comprise a subset of a transmitted set of data signals. The transmitted set of data signals may comprise data signals sent from one or more transmitter ports of another robotic device at a preset range of signal strengths.

In one implementation, each signal strength level may have an associated transmission radius or boundary, where the signal may be received successfully within the boundary but not received outside of the boundary. The radius or boundary may be set based on test data and/or attenuation calculations. For example, a close range signal may have a signal strength level of "1" (e.g. a first digital control value in a set of values) and be receivable up to 20 cm away, and a medium range signal may have a signal strength level of "2" (e.g. a second digital control value in a set of values) and be receivable up to 50 cm away. In a case when data signals are cycled through signal strength levels, e.g. by cycling through digital control values, if the at least one processor 240 receives two data signals with respective signal strengths of "1" and "2" then the other robotic device is determined to be within 20 cm; similarly, if only one data signal is successfully received with a higher signal strength of "2" then the other robotic device is determined to be within a range of 20 cm to 50 cm.

In the implementation described above, a distance resolution may be set based on a number of signal strength levels that are used, e.g. increasing the number of levels that are swept enables more accurate relative distance ranges to be determined. The maximum distance that may be determined depends on the voltage supply levels for the infrared transmitters. For a 6 Volt power supply, a maximum signal strength level may enable a maximum (robot-to-robot) distance of up to 9 metres to be determined.

Figure 3:
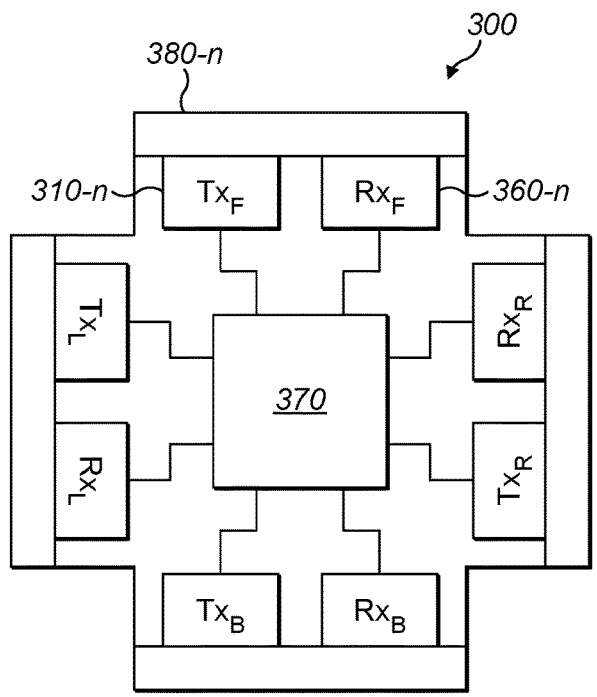
FIG. 3 is a schematic diagram of a mounting for an example infrared sensor assembly.

FIG. 3 is a schematic diagram of a mounting 300 for an example infrared sensor assembly. The schematic diagram provides a top view of the mounting 300. The mounting 300 may comprise a printed circuit board that is mechanically coupled to a robotic device, e.g. fastened to a polymer body section. The mounting 300 accommodates four sets of infrared transmitters 310 and receivers 360. The plurality of infrared transmitters 310 are equidistantly spaced around a circumference of the mounting. Each receiver in the plurality of infrared receivers 360 is mounted next to a corresponding transmitter in the plurality of infrared receivers 360, such that the infrared receivers are also equidistantly circumferentially spaced and the plurality of infrared receivers are interspaced within the plurality of infrared transmitters. Each transmitter and receiver pair is connected to circuitry 370. This circuitry 370 may comprise one or more of the components shown in either FIG. 1 or FIG. 2. In certain cases, the circuitry 370 may comprise one or more wired interfaces to one or more processors mounted elsewhere in the robotic device. In one case, the circuitry 370 comprises at least the infrared sensor assembly of FIG. 1.

The four sets of transmitter-receiver pairs in FIG. 3 are each mounted at around 90 degrees from each other. Hence, there is a front transmitter-receiver pair (F), a left transmitter-receiver pair (L), a right transmitter-receiver pair (R) and a back transmitter-receiver pair (B). Each transmitter-receiver pair is covered by an optical filter 380 comprising a material that is transparent to infrared radiation but opaque to visible light. In the example of FIG. 3, the transmitter-receiver pairs are located at the front, back, left and right of the robotic device (as viewed from above).

Further detail of how orientation is determined by the at least one processor 240 of FIG. 2 will now be explained with reference to FIG. 3.

A first robotic device with the mounting 300 transmits a set of data signals to a second robotic device with the mounting 300. As described above, for each receiver 360 in the mounting 300 of the second robotic device, a set of successfully received data signals are determined. As the transmitter-receiver pairs are mounted perpendicularly, a given receiver can only receive data signals from one or two transmission ports.

If only one set of data signals are received at a given receiver, then the transmission port for those data signals is determined using the message data and this transmission port is determined to be facing the determined receiver. For example, if data signals from transmitter $Tx_R$ of the first robotic device are the only data signals received at $Tx_F$ of the second robotic device, then the second robotic device is determined to be facing the right side of the first robotic device (i.e. the first robotic device is rotated by 90 degrees with reference to the second robotic device).

If two data signals are received from two different transmission ports at a given receiver, then the second robotic device is determined to be facing the first robotic device at an angle between two transmitters of the first robotic device (e.g. in a sector that has boundaries at multiples of 45 degrees). In this case, two different sectors are possible orientations. For example, if data signals from transmitters $Tx_L$ and $Tx_B$ of the first robotic device are received at $Tx_B$ of the second robotic device then the back of the second robotic device is facing one of two 45 degree sectors between the back and left side of the first robotic device (e.g. the first robotic device is rotated between 180 and 225 degrees or between 225 and 270 degrees relative to the second robotic device). In this case, a particular range of rotations is determined by comparing received signal strength values in the message data from both transmitters. If the signal strength level of the data signal transmitted from $Tx_L$ is weaker than the data signal transmitted from $Tx_B$, then transmitter $Tx_L$ is more aligned with the receiver $Tx_B$ of the second robotic device (as otherwise it would not be able to be received successfully). This enables the at least one processor 240 to select the larger rotation range of between 225 and 270 degrees. Similarly, if the signal strength level of the data signal transmitted from $Tx_B$ is weaker (e.g. has a lower value) than the data signal transmitted from $Tx_L$, then transmitter $Tx_B$ must be more aligned with the receiver $Tx_B$ of the second robotic device and the first robotic device is rotated between 180 and 225 degrees.

In general, certain examples herein enable a processor to compare signal strengths when messages from multiple transmission ports are successfully received, and a message containing a lowest signal strength level determines one of two possible sector ranges for the orientation of the robotic device. In this manner, an orientation of the first robotic device in relation to the second robotic device may be determined. In other implementations, the angular resolution of orientation detection may be increased by using an increased number of transmitter-receiver pairs. For example, using 8 pairs equidistantly and circumferentially spaced would double the resolution, enabling orientation to a nearest 22.5 degree sector to be determined. Non-equidistantly spaced transmitters and/or receivers may also be used, wherein the spacing used at any one point determines the angular resolution available. For example, a robotic device may have a decreased spacing at a front of the device to more accurately determine the orientation of other robotic devices that are facing the robotic device.

An advantage of the examples of FIGS. 1, 2 and 3 is that the infrared transmitters and receivers may also be used to communicate data between robotic devices, i.e. to set up an infrared communication channel. For example, signal strength levels may be swept on a periodic basis. Between these periodic sweeps, time periods may be reserved for data exchange. This data exchange may be performed at a predetermined signal strength level, e.g. at a maximum strength. Data exchange may enable co-ordinated behaviour between robotic devices. For example, a given bit stream message may indicate a set of movements for each robotic device to perform in a synchronised manner. In other cases, the distance and orientation information may be exchanged between robotic devices over the infrared channel, e.g. as associated with an identifier of the robotic device.

Another advantage of the examples of FIGS. 1, 2 and 3 is that low-cost components adapted for infrared communications, for example in television remote controls and the like, may be used to determine location and orientation information, as well as be used for communication. For example, standard frequencies for remote control may be used to modulate the data signals. This reduces component cost and increases simplicity. This is unusual, typically robotic devices use separate infrared systems for range finding and communications.

In certain examples, the at least one processor 240 is a main processing module for the robotic device. The main processing module may be mounted within a body of the robotic device. In these cases, the main processing module may comprise a reduced instruction set computer (RISC) using a Microprocessor without Interlocked Pipeline Stages (MIPS) instruction set. It may comprise a number of registers (e.g. 32) and be, for example, 32 or 64-bit. Control firmware for the main processing module may be written in C/C++ and compiled using a suitably adapted C compiler. In one example implementation, the main processing module comprises a PIC32x microcontroller. Other microcontrollers may be used in other implementations. As well as determining positioning information, the main processing module may interface with one or more of tracking lights, audio and video devices, reference sensors, wired and wireless communication units, a power supply unit, and locomotion modules for the robotic device.

According to an example, an embedded controller for a robotic device comprises a receiver interface to receive data signals from each of a plurality of infrared receivers coupled to the robotic device, said data signals comprising infrared signals transmitted by another robotic device, and a processor coupled to the interface. The processor may comprise the at least one processor 240 of FIG. 2 and the receiver interface may comprise a set of input pins for the at least one processor, e.g. input pins of a microcontroller. In this example, the processor is programmed to, for each of the received data signals: determine the infrared receiver that received the data signal; decode message data from the received data signal to determine: data identifying an infrared transmitter that transmitted the data signal, and data indicating a transmission strength for the data signal; and using the determined infrared receiver, the data indicating the transmission strength for the data signal and the data identifying the infrared transmitter that transmitted the data signal, determine an orientation of the robotic device in relation to the other robotic device and a distance of the robotic device from the other robotic device. This determination may be made using the processes described above. The infrared transmitter may be one of a plurality of infrared transmitters mounted upon another robotic device or static beacon.

In a variation of this example, an efficient decoding mechanism may be provided by matching received bit sequences against a set of possible transmitted bit sequences. For example, a simple logic operation may be applied to the received bit sequence and one of the set of possible transmitted bit sequences. This may be repeated for each member of the set. If a match is found, a signal strength and a transmission port may be read from a look-up table; if a match is not found, the received data signal may be discarded (e.g. deleted and not used for further processing). For example, if an entertainment robot is on the boundary of reception for a particular signal strength, then there may be a high likelihood of bit corruption. Instead of attempting to process the bit sequences for corrupted signals, this variation allows them to simply be ignored. Hence, processing resources are not wasted.

In one case, the embedded controller further comprises a transmitter interface to send data signals to each of plurality of infrared transmitters coupled to the robotic device and a control interface to send a control signal to a power supply. The power supply may comprise the controlled voltage source and the voltage-controlled current sources of FIGS. 1 and 2. The control signal may comprise the digital control signal of these examples. In other cases, the control signal may comprise an analogue control signal for power circuitry that is generated based on an initial digital value accessible to the processor. The transmitter and control interfaces may comprise different output pins of a microcontroller.

In the above case, the processor is programmed to generate a set of data signals for each of the plurality of infrared transmitters. Each of the set of data signals comprise data identifying the infrared transmitter that associated with the set of data signals, and data indicating a transmission strength for the data signal. Generating the data signals may comprise applying a bit sequence to a carrier wave to generate a modulated data signal. The bit sequence may comprise a bit pattern identifying a signal strength and a bit pattern identifying a transmission port. The processor is also programmed to generate the control signal for the power supply. The data signals are then sent to the plurality of infrared transmitters via the transmitter interface and the control signal is supplied to the power supply via the control interface. In this case, the data indicating a transmission strength for the data signal is set based on a value for the control signal for the power supply at a time the data signals are sent to the infrared transmitters, and wherein the value for the control signal for the power supply is varied over a predetermined set of values for each set of data signals. For example, the control signal may comprise a range of digital values for a digital voltage controller such as a digital potentiometer. Alternatively, the control signal may comprise an analogue current or voltage that is digitally controlled by the processor, e.g. as generated a digital-to-analog port of a microcontroller. The analogue current or voltage may be used to control a voltage buffer as described with reference to FIG. 1, i.e. to regulate the current passing through an LED.

According to one example, there is provided a method of determining a position of a first robotic device with respect to a second robotic device. The method may comprise operations as described above. These operations may comprise receiving, via a plurality of infrared receivers of the first robotic device, one or more of a set infrared data signals transmitted by the second robotic device. In this case, the set of infrared data signals are transmitted from each of a plurality of infrared transmitters of the second robotic device, and each infrared data signal comprises data identifying a respective one of the plurality of infrared transmitters and data indicating a signal strength, wherein the signal strength varies over the set of infrared data signals. The method then further comprises processing the received one or more infrared data signals to determine an orientation of the first robotic device in relation to the second robotic device and a distance of the first robotic device from the second robotic device. Examples of this process are provided above. This method may be performed by a processor of a robotic device.

Figure 4A:
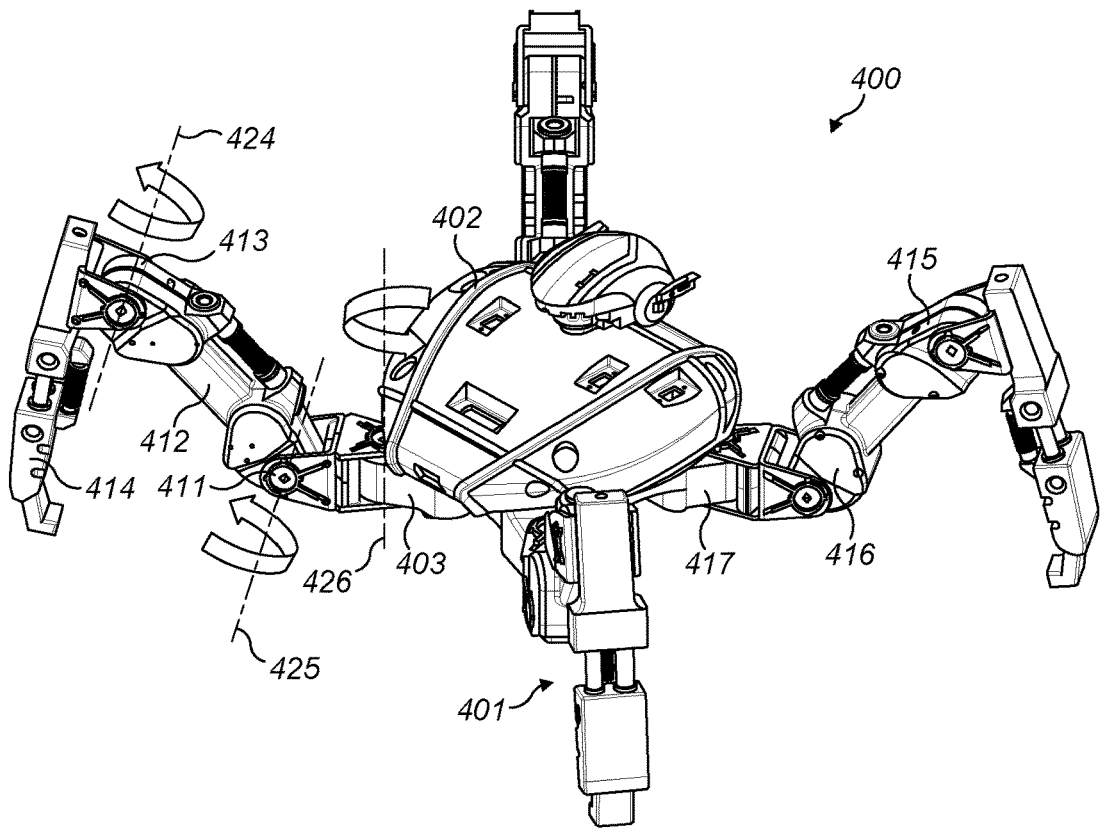
FIG. 4A is a perspective drawing of an example robotic device.
Figure 4B:
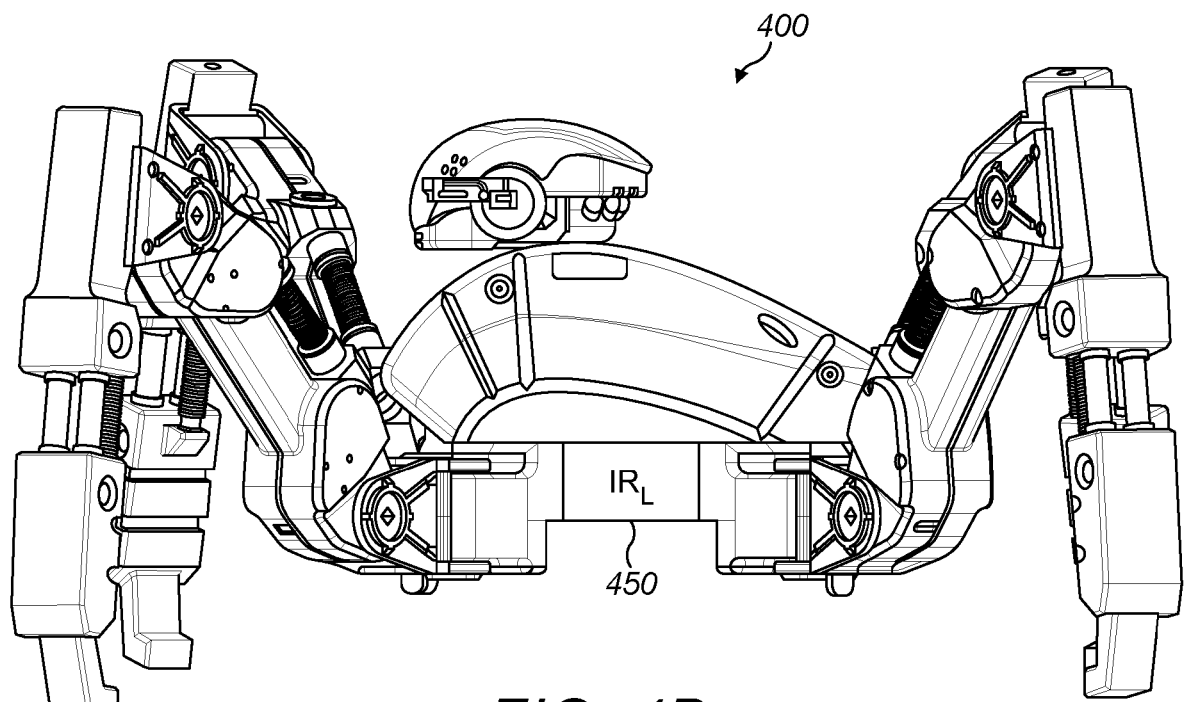
FIG. 4B is a drawing showing a left side of the example robotic device of FIG. 4A.
Figure 4C:
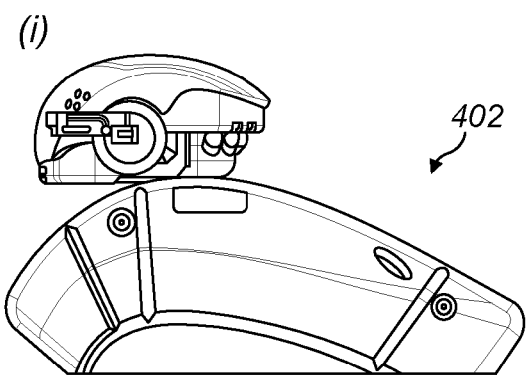
FIG. 4C is a drawing showing a left side of first and second body components for the example robotic device of FIG. 4A.
Figure 4C:
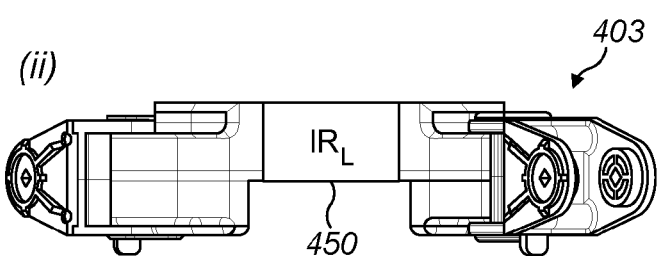

FIGS. 4A to 4C show an example robotic device that may integrate the infrared transmission assembly 100 of FIG. 1, the positioning system 200 of FIG. 2, and/or the mounting 300 of FIG. 3.

FIGS. 4A to 4C show an example of a legged consumer "gaming" robot with integrated motorised modules designed to actuate the robot joints. Although reference is made to a gaming robot implementation in this section, implementations in other robotic devices are also possible. In some implementations, prime movers are integrated within the design of the robot components (such as arms, legs or body). Control of these prime movers may be modified based on attached secondary modules such as "shields" or "weapons" that are identified using integrated circuits. In this manner, the gaming robot has an advanced functionality as compared to other forms of "toy" or "hobbyist" robot.

A gaming robot is a form of consumer or entertainment rather than industrial robot, i.e. is designed to be obtained and used by members of the public as opposed to provide useful industrial output. It may be considered a form of toy robot, although comprising functionality that is advanced for comparative "toys". A gaming robot may be supplied in a ready-to-use form, e.g. not requiring substantive assembly as is required with certain "hobbyist" robot kits. Use of a gaming robot requires no specialist technical knowledge, e.g. as compared to an industrial robot. A gaming robot is also designed to be handled and operated by a single user, e.g. in use comprise one or more units that may be manually lifted and carried. The range of functionality of the gaming robots described herein is large as compared to alternative "toys", for example, the gaming robots have a wider, more complex range of movements, whereas comparative "toy"

robots may have relatively little freedom of movement (e.g. a range of 1-10 movements) and/or relatively little ability to be controlled (e.g. operate within narrow behavioural ranges—such as move forward or back along a track). Comparative "toy" items are also designed to be disposable as a single unit, rather than modular in construction. Certain comparative "toys" may be available as modular construction kits, however these kits typically also have relatively little freedom of movement (e g simple motor rotation) and/or relatively little ability to be controlled (e.g. limited to on or off). Certain examples described herein provide a gaming robot with versatility, freedom of movement and serviceability, and which can also be manufactured inexpensively and be aesthetically pleasing.

The gaming robot shown in FIGS. 4A to 4C may be considered "intelligent". An intelligent gaming robot is operated under the control of a user (who also may be referred to as a player or gamer). The gaming robot is "intelligent" in that it implements semi-autonomous control functions that operate in conjunction (and communicate) with a computing or intelligent connective device, which is used by the user to control the gaming robot. The connective device that may take the form of a modern mobile phone (e.g. smartphone), a tablet computer or a pair of augmented reality goggles. The intelligent connective devices can receive inputs from the user via either a physical or a virtual gamepad (e.g. video game controller) consisting of a multiple of buttons and one or more joysticks. Using the gamepad of the connective device, the user is able to send top-level commands wirelessly to the intelligent robot (e.g. move forward, turn left, fire a weapon, kneel, jump . . . ). Top-level commands from the user are processed by the connective device and sent to the gaming robot, where they are interpreted by a kinematics engine of the gaming robot to produce low-level commands and control the intelligent robot joints. In examples, the connective device generates sets of high-level commands based on the top-level commands from the user, e.g. as input via the game controller, and based on a set of robot attributes. In certain examples, the connective device may receive location and orientation information from one or more gaming robots as determined using the methods described herein.

The gaming robot shown in FIGS. 4A to 4C may be capable of detecting its environment (e.g. other robots, obstacles). This may be performed using the apparatus, systems and methods described herein. Data regarding the environment, e.g. distance and orientation with reference to another robot, may be relayed wirelessly to the connective device to be incorporated within the gameplay. When more than one gaming robot and user are playing together they may "battle" each other through the gaming robot. A "battle" as discussed herein is simulated and gaming robots do not sustain physical damage, damage is instead virtual and managed within the gaming robot software application. Gaming robots and connective devices may be wirelessly coupled, e.g. in a peer-to-peer ad-hoc mesh network or via a co-ordinating game server coupled to a local or wide-area network, to further enhance the gaming experience. An infrared channel may be used to wirelessly communicate information, which may comprise an infrared channel implemented using the systems described herein. Based upon the configuration of each gaming robot (e.g. attached secondary modules, virtual items available and robot environment) and the inputs and skills of each user, the battle systems within the connective devices used, e.g. implemented as part of the gaming robot software application, compute the outcome of each battle. The outcome of each battle, including attack calculations and simulated weapon actions may use location and/or orientation data as computed herein. For example, certain weapons may only operate over a fixed distance, may require a certain orientation (e.g. face-to-face) or may have a greater impact based on orientation (e.g. a gaming robot may be deemed to be "weaker" on its left or right side).

In certain examples, the gaming robot may form part of an augmented reality system. In certain cases, the gaming robot features a tracking system that allows the connective device to compute the position, orientation, scale and attitude of the robot. The infrared systems described herein may provide information for this tracking system. When the connective device is equipped with a video camera and an adequate display screen, it may track the robot and augment reality through its display screen by adding for example special effects (e.g. explosions, fire, laser beams), virtual opponents or a virtual environment. In certain cases, an augmented reality experience may be improved by translating virtual special effects into the physical realm, e.g. by controlling the physical movement of the gaming robot. Augmented reality is particularly relevant to improve the single player experience, when the user would play by himself or herself with only one gaming robot.

Turning to FIG. 4A, this shows a perspective view of an example gaming robot 400. The design and configuration of the gaming robot is not intended to be limiting, other designs and configurations may be used. The gaming robot 400 is a legged robot having four identical legs. The gaming robot 400 is modular, and comprises three distinct module types (four locomotion modules 401, one main module 402 and one body module 403). FIG. 4C shows the main module 402 and the body module 403 separately.

The locomotion modules need not be limited to only one type of locomotion and may take several forms including leg module(s) to create a walking modular robot as shown, wheel module(s) to create a rolling modular robot (not shown) or propeller module(s) to create a flying modular robot (not shown). Locomotion modules may also be mixed in a given robot.

In FIG. 4A, each leg module 401 comprises a hip 411, a thigh 412, a knee 413, and a lower leg 414. Each of the legs is actuated by three prime movers 415, 416 and 417, which are each integrated within the gaming robot 400. Each of the prime movers 415, 416 and 417 confers to each leg three degrees of freedom, allowing the leg to rotate about three axes of rotation 424, 425 and 426. Two prime movers 415, 416 are integrated into each thigh 412. The remaining prime movers 417 are contained in the body module 403. In other example gaming robots, different joint configurations may be used, including those with leg modules that are detachable at the hip. In this latter case, all prime movers may be integrated into the leg.

FIG. 4B shows how a mounting similar to that in FIG. 3 may be arranged on the gaming robot of FIG. 4A. In this example, a mounting similar to mounting 300 in FIG. 3 is integrated into the body module 403 wherein the outer optical filter 380 is shown for a left panel 450. As such, the infrared transmitter-receiver pairs are mounted centrally on the gaming robot 400 between the locomotion modules 401. Each set of infrared transmitter-receiver pairs is thus arranged to send/receive infrared signals from one of the front, back, left or right of the robotic device.

FIG. 4C illustrates how at least the main module 402 and the body module 403 may be modular, i.e. may be detached and interchanged. In one case, each module can be mechanically and electrically connected to and disconnected from the rest of the gaming robot 400 with minimal skills or tools. In this configuration, the at least one processor 240 of FIG. 2 may be integrated within the main module 402 and couple to sensor mountings within the body module 403.

Certain examples described herein provide an efficient apparatus for determining a distance and orientation of another entertainment robot. Rather than requiring complex time-multiplexing systems, which require expensive and power-hungry electronics, a simple and efficient control configuration is provided. A power level of each infrared transmitter is set by varying a current of a voltage-controlled current source. Each transmission circuit is coupled to a common power level signal line, such that a single analog voltage may be set to control a power level of all transmitters in parallel. If the analog voltage is set using a digital-to-analog converter, or equivalent digitally controlled circuit, then a value of a digital control signal used to set the analog voltage may be used to efficiently derive a bit pattern that may be transmitted as part of a data signal to identify a signal strength. In one case, the value of the digital control signal may comprise a bit pattern that is directly encoded and transmitted, along with a transmission port identifier. This then reduces a need for complex encoding and decoding circuitry, which again may have a high power draw, and provides a simple protocol that is effective in entertainment robots. In gaming robots, an efficient implementation is especially important as they may rely on battery power to run, and may require rapid updates of position and orientation for an augmented reality game.

Figure 5A:
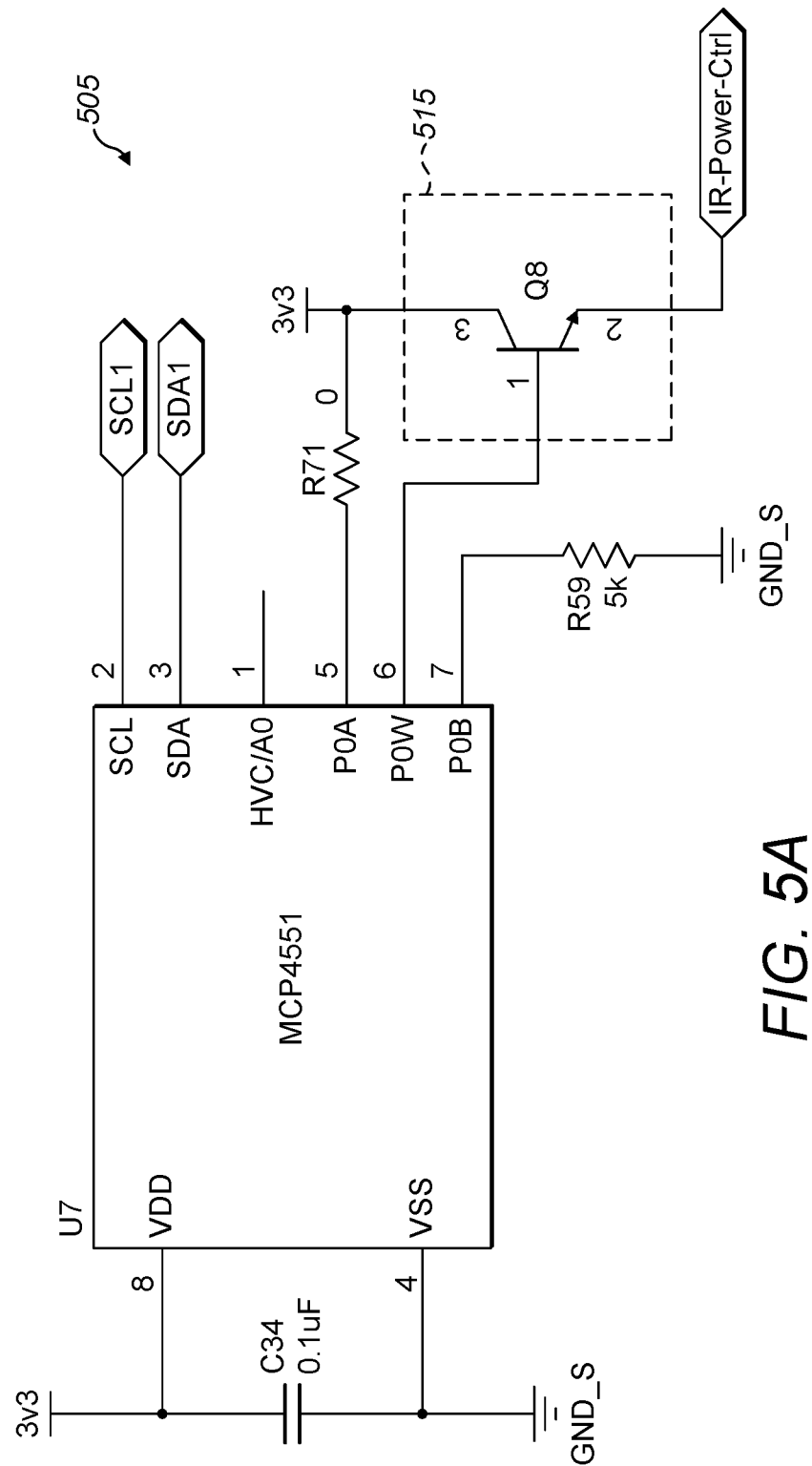
FIG. 5A is a circuit diagram showing a controlled voltage source according to an example.

FIG. 5A shows an example voltage controller than may form part of a controlled voltage source 505. In this example, the voltage controller comprises a digital potentiometer (an MCP4551 integrated circuit from Microchip Technology Inc.) that is controlled via a serial data line (SDA). A clock signal is also supplied on a serial clock (SCL) line. These signals may enable the voltage controller to be accessed and controlled from a microcontroller using an I²C interface. The VDD and VSS provide a supply voltage of 3.3V and a ground connection respectively. A data value set using the I²C interface provided via the SDA and SCL signal lines sets a resistance value for a resistor network configured between the POA, POW and POB output pins. Different data values applied via the I²C interface thus vary a configuration of a voltage divider set up between POA, POW and POB output pins. This in turn varies the current applied to the base terminal of transistor Q8 and sets the current that flows through Q8, i.e. from the collector to the emitter. The transistor Q8 thus implements a voltage buffer 515, as described previously. The current on the emitter of Q8 acts as an analogue infrared power control ("IR-Power-Ctrl") signal for each transmission circuit. Further example details of the operation of the voltage controller shown in FIG. 5A may be obtained from the data sheet for the MCP4551 integrated circuit.

Figure 5B:
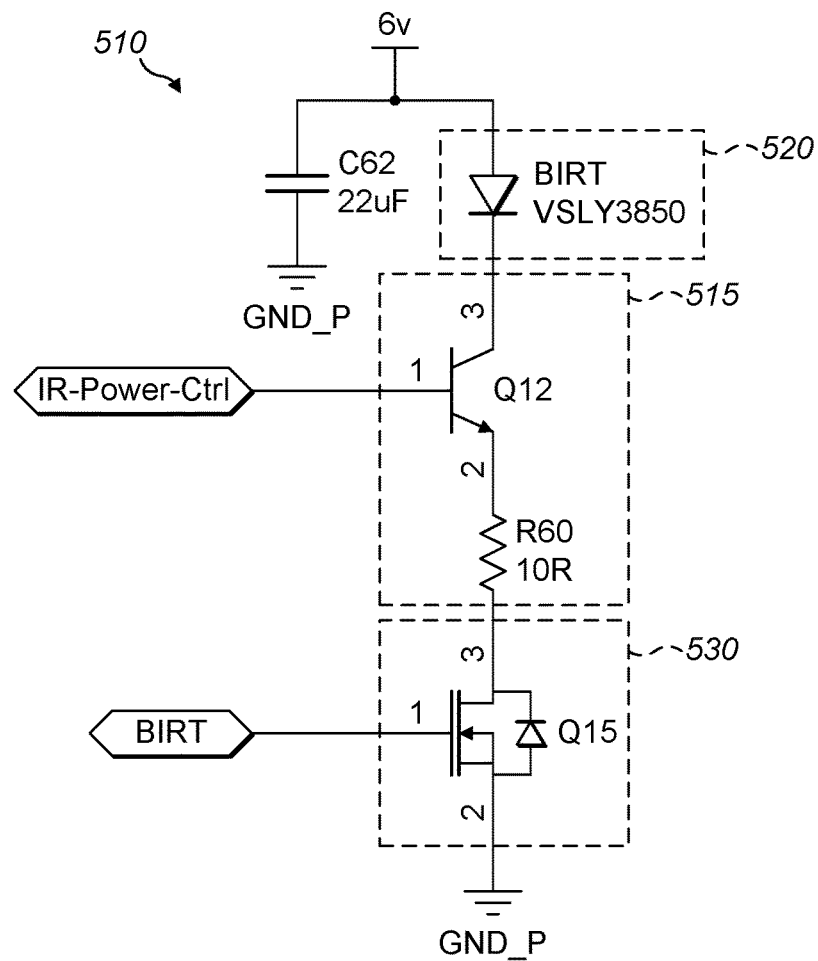
FIG. 5B is a circuit diagram showing a transmission circuit according to an example.

FIG. 5B shows an example transmission circuit 510 for one infrared transmitter. The transmission circuit 510 that is shown is for a "back" infrared transmitter, e.g. $Tx_B$ of FIG. 3. The other transmission circuits for the other infrared transmitters mirror this circuit, but with different modulated data signal lines. In FIG. 5B, example implementations for a voltage-controlled current source 515, an infrared transmitter 520 and a modulator 530 are shown. The power control signal from Q8 in FIG. 5A is electrically coupled to a base terminal of a further transistor Q12. Transistor Q12 and resistor R60 form the voltage-controlled current source 515 in this example circuit. As the current supplied on the power control signal from Q8 varies, this varies the current passing through Q12 that is drawn by resistor R60. An infrared LED "BIRT" is coupled in series between a 6V power supply and transistor Q12. This implements the infrared transmitter 520. The LED comprises a VSLY3850 as referenced above. A switching N-channel MOSFET Q15 is electrically coupled below resistor R60 and is driven by a 38 kHz modulated data signal. The MOSFET Q15 is electrically coupled in series between ground and the resistor R60, and in this example implements the modulator 530. The resistor R60 in this example implementation has a value of 10 ohms A bulk capacitor C62 with an example capacitance of 22 µF is further included between the 6V voltage source and ground.

Figure 5C:
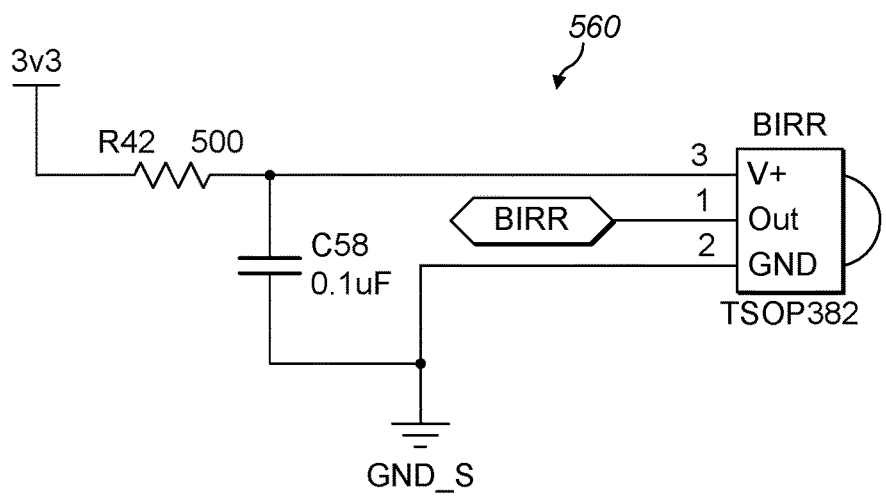
FIG. 5C is a circuit diagram showing an infrared receiver according to an example.

FIG. 5C shows an example receiver circuit 560. An infrared receiver in the form of a TSOP382 is electrically coupled between a 3.3V voltage source and ground. A decoupling capacitor with an example capacitance of 0.1 µF is also provided between the voltage source and ground. A resistor of 500 ohms is electrically coupled in series between the voltage source and the power in pin (V+) of the infrared receiver. An output pin of the infrared receiver provides a received demodulated data signal. This output pin may be electrically coupled to an input pin of a microcontroller.

It should be noted that the component values and configurations shown in FIGS. 5A to 5C are for example only and may vary between implementations depending on requirements.

In certain examples, an infrared transmitter assembly is provided. The transmitter assembly may comprise a controlled voltage source to provide a range of analog output voltages based on a digital control signal and a plurality of transmission circuits. In this case, each transmission circuit may comprise an infrared transmitter, a voltage-controlled current source to vary a current supplied to the infrared transmitter based on an output of the controlled voltage source, and a modulator electrically coupled to a data line to control the infrared transmitter in accordance with a data signal for said transmitter supplied on the data line. In this case, each of the transmitted data signals comprises data identifying a respective one of the plurality of infrared transmitters and data indicating a signal strength that is dependent on a value of the digital control signal. The infrared transmitter assembly may be used in devices other than a gaming robot. It may be used with an infrared receiver assembly, or used independently of any infrared receiver assembly.

In certain examples, a positioning system for a robotic device, such as a gaming robot is provided. The positioning system comprises transmission circuitry. The transmission circuitry comprises a plurality of infrared transmitters, each infrared transmitter being controlled by a respective data signal, and a respective plurality of voltage-controlled current sources, such that a given voltage-controlled current source controls the power of each infrared transmitter by varying a current. The positioning system also comprises a plurality of infrared receivers, at least one processor to generate data signals for the infrared transmitters and to receive data signals from the infrared receivers, and a controlled voltage source to control the plurality of voltage-controlled current sources based on a digital control signal. Each of the data signals, e.g. each of the generated and/or received data signals, comprises data identifying a respective one of the infrared transmitters and data indicating a signal strength that is dependent on a value of the digital control signal. The at least processor is programmed to determine a distance and orientation of another robotic device based on received data signals from the plurality of infrared receivers.

The above features are to be understood as illustrative examples of the invention. Further examples of the invention are envisaged. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

What is claimed is:

1. An entertainment robot comprising:
a plurality of transmission circuits, each transmission circuit comprising
an infrared transmitter controlled by a respective data line;
a plurality of infrared receivers;
at least one processor to generate respective data signals for supply on each of the data lines of the infrared transmitters, each of the generated data signals for the infrared transmitters comprising a bit pattern identifying a respective one of the infrared transmitters and a bit pattern indicating a signal strength,
wherein the at least one processor is programmed to:
receive data signals from another entertainment robot via one or more of the plurality of infrared receivers,
decode the received data signals to determine bit patterns indicating a set of signal strengths at which the received data signals were transmitted,
decode the received data signals to determine bit patterns indicating a set of infrared transmitters of the other entertainment robot from which the received data signals were transmitted, and
determine a distance and orientation of the other entertainment robot based on the determined bit patterns and the one or more of the plurality of infrared receivers,
wherein each transmission circuit further comprises:
a voltage-controlled current source to vary a current supplied to each infrared transmitter based on a voltage set on a power level signal line; and
wherein the entertainment robot further comprises:
a controlled voltage source to set the voltage of the power level signal lines as one of a range of analog output voltages based on a digital control signal, wherein a value of the digital control signal is used to set the bit pattern indicating the signal strength in the generated data signals.

2. The entertainment robot of claim 1, wherein a voltage-controlled current source in each transmission circuit is electrically coupled in series with an infrared transmitter, and wherein each transmission circuit comprises:
a modulator electrically coupled in series with the voltage-controlled current source to control said transmitter based on a modulated data signal.

3. The entertainment robot of claim 2, wherein the controlled voltage source comprises a digital potentiometer electrically coupled to a voltage buffer.

4. The entertainment robot of claim 3, wherein each voltage-controlled current source comprises:
a transistor electrically coupled in series between the infrared transmitter and the modulator,
wherein the transistor is controlled by an output of the voltage buffer, and
wherein the output of the voltage buffer controls each transistor in the plurality of transmission circuits.

5. The entertainment robot of claim 4, wherein each voltage-controlled current source comprises:
a resistor electrically coupled in series between the transistor and the modulator.

6. The entertainment robot of claim 4, wherein the voltage buffer and the transistor in each voltage-controlled current source comprise an NPN bipolar junction transistor.

7. The entertainment robot of claim 2, wherein each modulator in the plurality of modulators comprises an N-channel metal-oxide-semiconductor field-effect transistor (MOSFET).

8. The entertainment robot of claim 2, wherein the voltage supply for each transmission circuit is greater than the voltage supply for the digital voltage controller.

9. The entertainment robot of claim 2, wherein each transmission circuit comprises a bulk capacitor.

10. The entertainment robot of claim 1, wherein the at least one processor is electrically coupled to the controlled voltage source to supply the digital control signal.

11. The entertainment robot of claim 1, wherein the controlled voltage source forms part of the at least one processor.

12. The entertainment robot of claim 1, comprising:
a sensor assembly mounting the plurality of infrared transmitters and the plurality of infrared receivers,
wherein the plurality of infrared transmitters and the plurality of infrared receivers are equidistantly circumferentially spaced.

13. The entertainment robot of claim 12, wherein the plurality of infrared receivers are interspaced within the plurality of infrared transmitters.

14. The entertainment robot of claim 12, wherein the sensor assembly comprises a printed circuit board.

15. The entertainment robot of claim 1, wherein each data signal comprises a frequency modulated signal.

16. The entertainment robot of claim 1, wherein each infrared receiver in the plurality of infrared receivers comprises integrated circuitry to receive and demodulate an infrared signal.

17. The entertainment robot of claim 1, wherein each of the data signals comprises data identifying the entertainment robot.

18. The entertainment robot of claim 1, comprising four infrared transmitters and four infrared receivers respectively oriented at the front, back, left and right of the entertainment robot.

19. The entertainment robot of claim 1, wherein the processor is programmed to:
compare bit patterns decoded from a received data signal with a list of possible transmitted bit patterns;
responsive to a match, determine a signal strength and infrared transmitter associated with the matching bit pattern; and
responsive to no match, discard the received data signal.

20. A method of determining a position of a first entertainment robot with respect to a second entertainment robot comprising:
at the second entertainment robot:
determining a set of digital control signal values for a controlled voltage source;
generating a set of data signals for each of a plurality of infrared transmitters, each of the set of data signals comprising:

a bit pattern identifying an infrared transmitter from the set of infrared transmitters that is to transmit the data signal, and a bit pattern indicating a transmission strength for the data signal, the bit pattern being generated based on one of the set of digital control signal values, wherein the set of data signals comprise bit patterns for each infrared transmitter and each of the set of digital control signal values; and applying the set of digital control signal values to control a voltage output by the controlled voltage source, the voltage being used to vary a current of a voltage-controlled current source provided for each infrared transmitter; and sending the data signals to the plurality of infrared transmitters such that the bit patterns indicating a transmission strength are synchronised with the applied set of digital control signal values;

at the first entertainment robot:

receiving, via a plurality of infrared receivers of the first entertainment robot, one or more of the set of infrared data signals transmitted by the second entertainment robot, decoding the received data signals to determine the bit patterns indicating a set of signal strengths at which the received data signals were transmitted, decode the received data signals to determine the bit patterns indicating a set of infrared transmitters of the second entertainment robot from which the received data signals were transmitted, and determine a distance and orientation of the second entertainment robot based on the determined bit patterns and the one or more of the plurality of infrared receivers.

* * * * *